Aug. 30, 1927.  
R. B. NOBLE  
1,640,904  
BEARING PULLER  
Filed Nov. 1, 1926
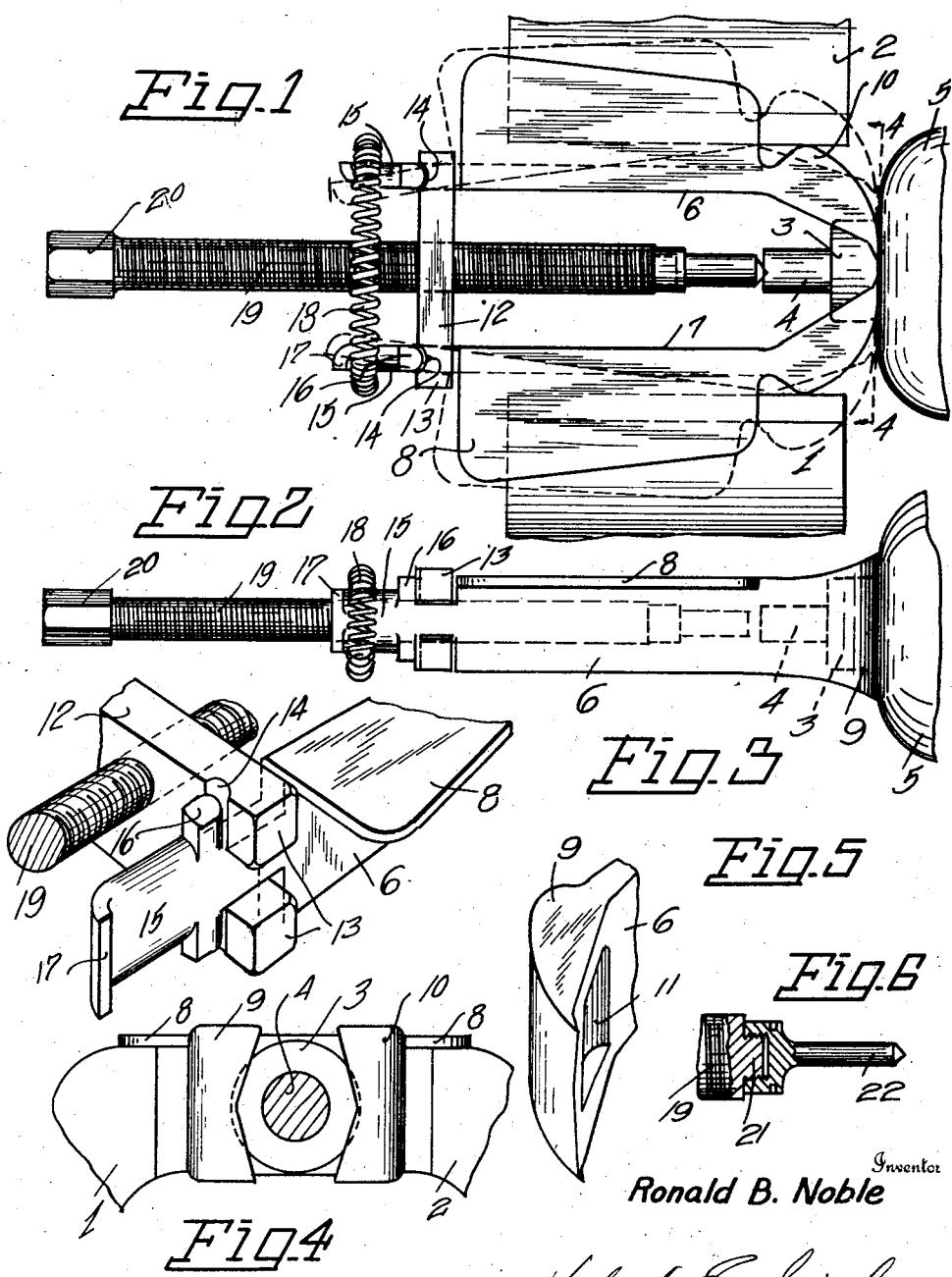
Inventor  
Ronald B. Noble  
By Herbert E. Smith  
Attorney Patented Aug. 30, 1927.

1,640,904

UNITED STATES PATENT OFFICE.

RONALD B. NOBLE, OF SPOKANE, WASHINGTON.

BEARING PULLER.

Application filed November 1, 1926. Serial No. 145,569.

My present invention relates to improvements in assembling tools which while designed especially for pulling bearings, bushings, etc., from, or placing them in position on their shafts, is also capable of use in various other ways about machine shops, automobile repair shops and similar places.

The primary object of my invention is the provision of an assembling tool for use in connection with a well known type of vise or clamp. The invention contemplates a tool which may readily be assembled, used with facility, and when necessary may be dismantled for making repairs or replacement of parts. The minimum number of elements or members employed in the tool render it durable and not subject to breakage, and at the same time reduces the cost of manufacture of the tool.

The operating element of the assembling tool is a screw bar combined with a cross head and clamping jaws, and the invention consists in certain novel combinations and arrangement of these parts as will hereinafter be more clearly pointed out and claimed.

In the accompanying drawings, I have illustrated one complete example of the physical embodiment of my invention wherein the parts are combined and arranged according to the best mode I have thus far devised for the practical application of the principles of my invention.

Figure 1 is a plan view of the assembling tool used in combination with a vise, and applied to the shaft and bearing of an electric motor for removing the bearing;

Fig. 2 is an edge view of the tool of Fig. 1 with the vise jaws omitted;

Fig. 3 is an enlarged perspective view of the connection between a pulling jaw and the cross head;

Fig. 4 is a detail end view of the tool as at line 4—4 of Fig. 1, showing a journal or shaft in section;

Fig. 5 is a perspective view of one of the jaws; and

Fig. 6 is a detail sectional view showing one of the interchangeable bearing pins for the screw bar.

The assembling tool is designed for use in combination with a vise, and in Figs. 1 and 2 the jaws of such a vise are indicated as 1 and 2. The assembling tool is supported by the jaws of the vise and adapted to pull a bearing 3 from the shaft 4 of a motor 5 as indicated in Figs. 1 and 2.

The assembling tool comprises a pair of side plates 6 and 7 each having a horizontal flange 8 adapted to rest upon the respective jaws 1 and 2 of the vise. At the ends of the side plates are fashioned jaws 9 and 10 and the adjoining inner faces of these jaws are provided with recesses 11. These recesses are adapted to engage over the bearing 3 when the jaws of the tool are brought together by clamping together the jaws 1 and 2 of the vise. Thus in Fig. 1 it will be seen that the two jaws 9 and 10 are rigidly clamped on the bearing 3 by means of the vise jaws 1 and 2, and the assembling tool is ready to be operated to remove the bearing from the shaft 4.

These side plates 6 and 7 are hinged at the opposite ends of a cross head 12 and the cross head is fashioned with slotted or bifurcated ends 13 for this purpose. Near the ends of the cross head and on its outer face are provided pairs of grooves 14 that extend transversely of the slots in the ends of the cross head. On the ends of the side plates are fashioned shanks 15 which fit into the slotted ends of the cross head, and lugs 16 on these shanks are adapted to engage in the pairs of grooves 14 of the cross head. The side plates are thus removably connected to the cross head and a hinged joint is formed between each side plate and the cross head by means of the lugs 16 and grooves 14.

The extremities of the shanks 15 are provided with outwardly flaring flanges 17, and a spring 18 is passed around these two flared ends or flanged ends for the purpose of normally distending the jaws 9 and 10 of the tool. Thus it will be seen that the jaws of the tool are closed over the bearing 3 by means of the jaws of the vise, against the tension of the spring 18, and of course when the jaws of the vise are released to free the jaws of the tool, the spring 18 by contraction, releases the jaws of the tool from the bearing.

The tool is operated by means of a screw bar 19 threaded through a complementary opening in the cross head 12 and turned by means of a wrench or other device applied to the angular head 20 at one end of the screw bar. The other end of the screw bar is provided with a reduced threaded extension 21 upon which a centering pin 22 may be screwed. This pin is removable and may be replaced by a pin of larger or smaller diameter depending upon the size of the shaft 4 with which the tool is used.

It will be apparent that by turning the screw bar 19 in the cross head 12 and with the pin 22 in engagement with the shaft 4, the removable bearing 3 will be pulled from the shaft 4 as the screw action progresses. After the bearing has been removed the vise jaws are released and the parts of the tool may be separated and stored away when not in use. The parts may readily be assembled when desired for use and the tool is ready to be operated when required.

Having thus fully described my invention, what I claim as new and desire to secure by Letters Patent, is:—

1. The combination with a cross head and a screw bar therein, of a pair of side plates each having a supporting flange and an end jaw, and a separable hinge joint between the side plates and said cross head.

2. The combination with a cross head having bifurcated ends and grooves arranged transversely thereof, of a pair of side plates, a shank on each plate and a pair of separable lugs on each shank forming a hinge connection with the grooves in the cross head, the side plates being formed with flanges and with jaws at the ends of said plates, and a screw bar in the cross head.

3. The combination with a screw bar and its cross head having bifurcated ends and transversely arranged grooves, of a pair of side plates, jaws on said plates having recesses in opposing faces, there being supporting flanges on said plates, shanks on said plates having lugs for engagement with the cross head forming a hinge connection therewith, and a spring connecting said shanks.

In testimony whereof I affix my signature.

RONALD B. NOBLE.